Nov. 7, 1939.  A. LEWIS  2,179,045
LOCKED PIPE CLOSURE
Filed March 3, 1938
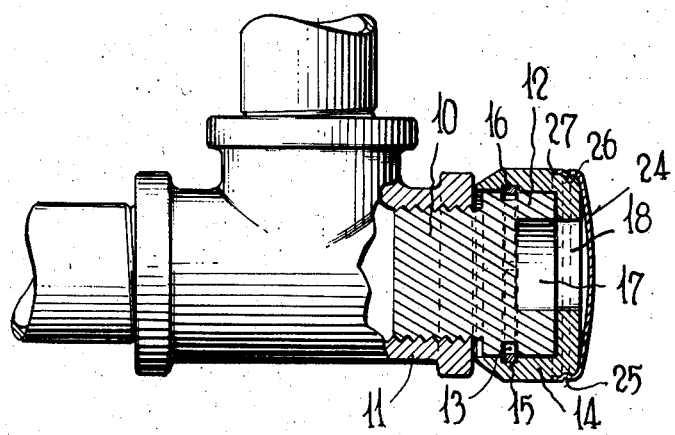
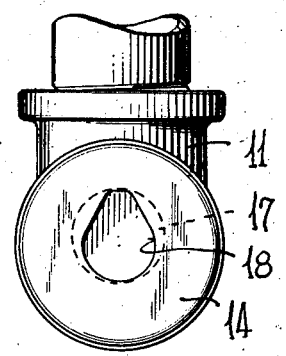
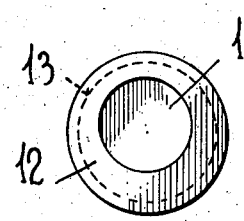
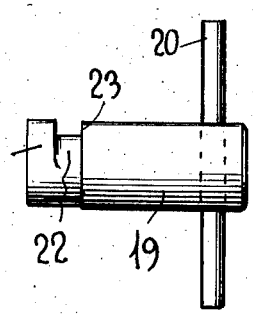
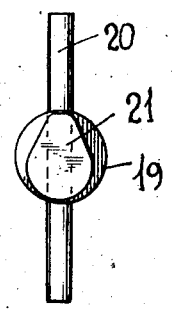
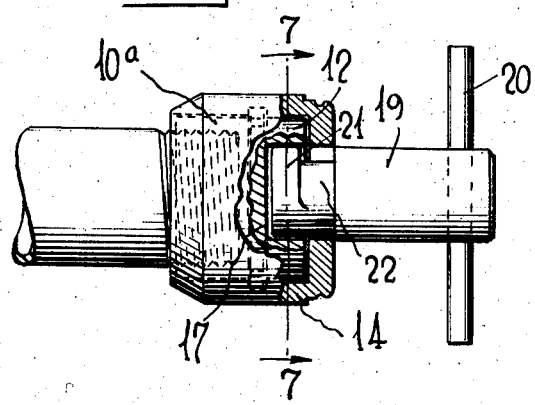
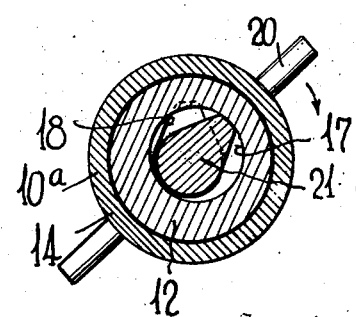
Inventor
Arthur Lewis,
By *Karl Fenning*
His Attorney Patented Nov. 7, 1939

2,179,045

UNITED STATES PATENT OFFICE 2,179,045

LOCKED PIPE CLOSURE

Arthur Lewis, Astoria, Long Island, N. Y.

Application March 3, 1938, Serial No. 193,753

7 Claims. (Cl. 220—39)

The invention has to do particularly with a plug or a cap for closing the ends of pipes. It contemplates a device which may be readily, simply and easily applied to a pipe for the closure but which may not be removed from the pipe without marring or destroying a portion of the apparatus and only by use of a specially formed key.

The threaded member which engages the pipe is associated with a cover member which is free to rotate thereon and which may be removed therefrom only by marring or breaking a portion of the device. An aperture in the rotatable member allows the insertion of a key for engaging and rotating the threaded member. The key aperture in the rotatable member is covered and sealed by a cap engaging the rotatable member in such a way that the cap must be marred or broken in its removal.

The threaded member of the pipe closure may consist of a solid member having threads on its outer sides to engage internal threads of a pipe or coupling, or the threaded member may consist of a hollow, cap-like device threaded on its interior to engage the threads on the outside of a pipe or the like.

In the accompanying drawing, showing preferred forms of the device Figure 1 is a side elevation partly in section showing a pipe closure applied to an internally threaded coupling. Fig. 2 is an end elevation of Fig. 1 with the covering cap removed. Fig. 3 is an end elevation of the threaded member. Figs. 4 and 5 are respectively side and end elevations of a key. Fig. 6 is a side elevation, broken away in part, of a closure member installed on an externally threaded pipe, the cap being omitted and the key being shown in place. Fig. 7 is a section on the line 7—7 of Fig. 6.

A threaded member 10 is shown in Fig. 1 as screwed into a coupling 11. The member 10 is shown threaded on its outer surface and is solid so that when it is screwed into position it closes the coupling 11 and any pipes connected therewith. The threaded member 10 has an enlarged head 12 which is provided in its outer surface with a circumferential annular slot 13. Overlying the head 12 is a hollow cap 14. The opening in the hollow cap 14 is substantially the same size as the head 12 and they are both shown cylindrical in form so that when the cap 14 is put in place it neatly covers the head 12, and as illustrated, may extend slightly beyond the inner edge of the head 12. In the inner surface of the cap 14 is an annular recess 15 adapted to be brought into register with the recess 13. Before the cap 14 is put in place a split ring 16 may be put in the cavity 13 and extend slightly therebeyond so that when the cap 14 is put in place the split ring 16 will also engage the annular cavity 15. This will hold the cap 14 in place on the head 12 and prevent its removal but will allow the cap 14 to rotate on the head 12. As so closed it is impossible to rotate the threaded member 10 since only the cap 14 is exposed and rotation of it will not turn the threaded member. In the end of the head 12 is provided a recess or hole 17 here illustrated as a circular hole placed eccentrically in the head 12. In the end of the cap 14 and overlying the hole 17 is an irregularly shaped hole 18. As illustrated the hole 18 is formed from a centrally disposed circle having two more or less oppositely disposed tangents drawing toward each other at the outer edge of the hole. The outer end of the hole extending substantially so far from the center of the cap 14 as the outermost point in the eccentric hole 17.

For manipulation there may be provided a key having a stem 19 through which passes a finger rod 20. The end of the key consists of a gripping member 21 which corresponds in shape and size with the hole 18. Between the member 21 and the stem 19 is a reduced cylindrical portion 22. The lower edge 23 of the stem 19 will preferably be separated from the base of the key 21 a distance substantially equal or a little greater than the distance from the bottom of the member 17 from the outer face of the cap 14 and the width of the slot between the end 23 and the key member 21 will preferably be slightly more than the thickness of the head of the cap 14. Thus the cap 14 may be turned so that the entire opening 18 overlies or is in register with the eccentrically arranged opening 17. In this condition the key may be inserted and the member 21 will pass through the opening 18 and into the opening 17. In this position the key may be turned either clockwise or counterclockwise and the tip of the member 21 will engage the side wall of the opening 17 and since the stem 22 will rest against the side wall of the hole 18 the member 21 will snugly engage the wall of the hole 17 so that when the key is turned the threaded member 10 will turn with the key. By this means the threaded member may be withdrawn from its seat or forced further on to or into its seat.

It will be understood that the device is one which may be operated only by a person having a properly formed key. To prevent indiscriminate and unauthorized operation of the device even with a suitable key a cover member 24 may be provided. The cover member 24 will preferably be made of some thin, soft, resilient material which will readily tear or be deformed when tampered with. Thin sheet steel may be employed. As shown it is provided with a rib 25 in its side adapted to engage an annular channel 26 in the cap 14. The cover 24 may thus be forced in place against the annular shoulder 27 provided for it in the head of the plug 14 at which time the rib 25 will engage the annular channel 26 and hold the cover 24 snugly in place. The cover 24 will preferably be very fragile and readily marred and deformed, so that it will be impossible to remove it without deforming or destroying it, such deforming or destruction on removal being a clear indication that the pipe closure has been tampered with.

In Fig. 6 the key is shown in place upon a hollow threaded member 10a which is provided with a head 12 and cap 14 and other portions similar to those already described the cover 24 being omitted. In Fig. 7 the key member 21 has been shown engaging the opening 17 by which the head 12 has been turned away from the opening 16 through which it was inserted in such a way as to turn the threaded member.

When the closure is in place and the hollow device is assembled it can be removed only by destroying or marring part of the apparatus. Thus it cannot be tampered with surreptitiously. It cannot be opened even with a key without first removing and destroying or marring a part of the apparatus.

Because the portion of the device destroyed or marred is small and because the rest of the device can be used repeatedly by merely supplying another sealing closure the device provides efficiency combined with economy.

The device readily lends itself for use in connection with pipes of various sorts which it is desired should not be tampered with by unauthorized persons. It is especially adapted for use with gas pipes, oil pipes, water pipes and other systems which may otherwise be tapped and the contents withdrawn. It may also be used in sealing drums or other containers which for any reason it may be desired to securely and safely seal against tampering.

The matter shown and described is given for illustrative purposes only, it being obvious that various changes may be made and that the invention may be embodied in other forms.

I claim as my invention:

1. In a pipe seal, a threaded member having a circular hole in its head enclosing its center, a cap having an aperture fitting over the side of the member and having in its head a hole about its center and extending toward one edge the length of the hole being substantially equal to the diameter of the hole in the member, means to hold the cap and member from relative longitudinal movement while allowing relative rotary movement, and a key having an eccentrically extending arm adapted to pass through the hole in the cap and so proportioned in respect to the holes as to engage the wall of the hole in the threaded member.

2. In a pipe seal, a threaded member having an eccentrically arranged circular hole in its head and including the center in its area, a cap having an aperture fitting over the side of the member and having a hole in its head, the periphery of the cap hole in one relative position lying entirely within the periphery of the plug hole but in other relative positions extending at least in part beyond the periphery of the plug hole, and means for locking the member and cap against relative longitudinal movement but allowing relative rotary movement between them.

3. In a pipe seal, a threaded member having an eccentrically arranged circular hole in its head and including the center in its area, a cap having an aperture fitting over the side of the member and having a hole in its head, the periphery of the cap hole in one relative position lying entirely within the periphery of the plug hole but in other relative positions extending at least in part beyond the periphery of the plug hole, a key passing through the cap hole and into the member hole and so proportioned in respect to the holes as to turn and cause lateral impingement of the key against the side of the member hole so as to cause the member to turn with the key.

4. In a pipe seal, a threaded member having an eccentrically arranged circular hole in its head and including the center in its area, a cap having an aperture fitting over the side of the member and having a hole in its head, the periphery of the cap hole in one relative position lying entirely within the periphery of the plug hole but in other relative positions extending at least in part beyond the periphery of the plug hole, a key passing through the cap hole and into the member hole and so proportioned in respect to the holes as to cause the key to tend to jam between one side of one hole and another side of the other hole so as to cause the ensemble to turn with the key.

5. In a pipe seal, a threaded member having an eccentrically arranged hole in its head and including the center in its area, a cap having in its head a hole about its center and extending toward one edge to overlie and be in register with the eccentrically arranged hole in one relative position of cap and member, the holes at one point in their peripheries coinciding in such position, a key insertible through the cap hole into the member hole so proportioned in respect to the holes as to bind between the coinciding peripheries and another portion of the wall of the hole in the member, and means for locking the member and the cap against relative longitudinal movement but allowing relative rotary movement between them.

6. In a pipe seal, a threaded member having an eccentrically arranged hole in its head, a cap having an aperture fitting over the side of the member and having in its head a hole extending toward one edge to overlie the eccentrically arranged hole said two holes being so disposed and proportioned relatively to each other that in one relative position of the member and cap a key substantially fitting the hole in the cap may be inserted therethrough into the hole in the member and in other relative positions of member and cap the walls of the cap will overlie and in part at least extend beyond the periphery of the hole in the member, and means for locking the member and cap against relative longitudinal movement but allowing relative rotary movement between them.

7. In a pipe seal, a threaded member having an eccentrically arranged hole in its head and including the center in its area, a cap having an aperture fitting over the side of the member and having in its head a hole about its center and extending toward one edge to overlie and be in register with the eccentrically arranged hole in one relative position of cap and member, means for locking the member and cap against relative longitudinal movement but allowing a relative rotary movement between them and a key having an excentrically extending arm adapted to pass through the hole in the cap and engage the hole in the threaded member so proportioned in respect to the holes as to cause the ensemble to turn with the key.

ARTHUR LEWIS.